(12) United States Patent
Akashi

(10) Patent No.: US 7,302,133 B2
(45) Date of Patent: Nov. 27, 2007

(54) OPTICAL SWITCH

(75) Inventor: Tamotsu Akashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/748,592

(22) Filed: May 15, 2007

(65) Prior Publication Data

US 2007/0211988 A1    Sep. 13, 2007

Related U.S. Application Data

(62) Division of application No. 11/152,150, filed on Jun. 15, 2005, now Pat. No. 7,233,716.

(30) Foreign Application Priority Data

Mar. 28, 2005  (JP)  ............................. 2005-092032

(51) Int. Cl.
G02B 6/26       (2006.01)
G02B 6/42       (2006.01)

(52) U.S. Cl. .......................................................... 385/18

(58) Field of Classification Search ............ 385/17–18; 398/45; 359/388
See application file for complete search history.

(56) References Cited

U.S. PATENT DOCUMENTS

| | | | |
|---|---|---|---|
| 6,439,728 B1 | 8/2002 | Copeland | 359/515 |
| 6,707,959 B2 | 3/2004 | Ducellier et al. | 385/17 |
| 6,798,951 B2 | 9/2004 | Fabiny | 385/37 |
| 2003/0053749 A1 | 3/2003 | Weverka et al. | 385/24 |

Primary Examiner—Michelle Connelly-Cushwa
Assistant Examiner—Chris Chu
(74) Attorney, Agent, or Firm—Staas & Halsey LLP

(57) ABSTRACT

There is provided an optical switch for reducing an apparatus size without making a structure for switching an output path complicated, wherein the first reflecting member and the micromirror array, which are optically coupled with the diffraction grating via the second reflecting member, are arranged at the same side relative to the diffraction grating.

3 Claims, 13 Drawing Sheets

OPTICAL SWITCH

This application is a divisional of application Ser. No. 11/152,150, filed Jun. 15, 2005, now U.S. Pat. No. 7,233,716, which is incorporated herein by reference.

BACKGROUND OF THE INVENTION

1) Field of the Invention

The present invention relates to an optical switch applied to a wavelength division multiplexing (WDM) system, and particularly to an optical switch (wavelength selective switch) which comprises a plurality of input/output ports (may comprise a single input or output port) and has a function capable of selectively outputting an input wavelength-multiplexed signal to any output port for each wavelength.

2) Description of the Related Art

FIG. 13 is a top schematic view showing a conventional optical switch 102A (refer to U.S. Pat. No. 6,707,959). The optical switch 102A shown in FIG. 13 comprises an input/output unit 122, a concave mirror 120, a diffraction grating 124 arranged in Ebert type and a MEMS (Micro Electro Mechanical Systems) mirror array 126. The input/output unit 122 is constituted of a plurality of optical fibers 132 (in this case, four optical fibers 132A to 132D) a plurality of collimate lenses (in this case, four collimate lenses 134A to 134D) and a lens 136 as shown in FIG. 14, for example.

In the optical switch 102A constituted in this manner, a wavelength-multiplexed light beam from any one of the optical fibers 132 (for example, a light beam from the optical fiber 132A) is spectrally diffracted to be subjected to switching of an output path for each wavelength, and is output to any one of the optical fibers 132B to 132D, for example. In other words, the optical switch 102A can perform a wavelength selecting operation which is an operation of selecting a wavelength to be output to the output fiber 132B to 132D as an output destination.

For example, after a light beam is made to be a parallel beam in the collimate lens 134A corresponding to the optical fiber 132A and the direction thereof is changed in the lens 136, the parallel beam is reflected on the concave mirror 120 to be directed to the diffraction grating 124, and it is separated for each wavelength in the diffraction grating 124 and then is reflected on the concave mirror 120 again to be directed to the MEMS mirror array 126.

The MEMS mirror array 126 comprises MEMS mirrors (not shown) for individually reflecting a light beam separated for each wavelength, and controls an angle of each MEMS mirror in a direction perpendicular to the sheet (that is, in an arrangement direction of the optical fibers 132A to 132D), thereby controlling a reflecting direction of the light beam for each wavelength. A light reflected on the MEMS mirror reversely travels on the path and is classified to any one of the fibers 132B to 132D in correspondence to the angle of the light beam for each wavelength incident into the input/output unit 122. Thus the wavelength selecting operation is enabled.

Additionally, a well-known technique related to the present invention includes a wavelength router 210 shown in FIG. 15 (refer to U.S. Pat. No. 6,439,728). FIG. 16 is a diagram viewed from an arrow A in FIG. 15 and shows an arrangement relationship between the optical fibers 212, 215 and reverse reflectors 230 (1 . . . N) provided in the wavelength router 210.

The input fiber 212 and the output fibers 215 shown in FIG. 15 correspond to the input/output unit 122 in FIG. 13 and the reverse reflectors 231 (1 . . . N) correspond to the MEMS mirror array 126. As shown in FIG. 16, the arrangement relationship between these input fiber 212, the output fibers 215 and the reverse reflectors 230(1 . . . N) is also similar. In other words, the reverse reflectors 230 (1 . . . N) in FIG. 15 are arranged in parallel in a direction parallel to the sheet, and the input fiber 212 and the output fibers 215 are arranged in parallel in a direction perpendicular to the sheet.

In the wavelength router 210 constituted in this manner, a light beam 218 output from the input fiber 212 propagates through a glass body 211, is reflected on a concave mirror 240 constituting the inner wall of the glass body 211, and is spectrally diffracted in a diffraction grating 225, and then is reflected on the concave mirror 240 again and directs toward the reverse reflectors 230 (1 . . . N) for each wavelength. When reflecting a spectrally-diffracted light beam, each reverse reflector 230 (1 . . . N) moves an optical axis of the reflected light in parallel to a direction 235 corresponding to the arrangement direction of the optical fibers 215. Thus, the reflected light beam can be coupled with the optical fiber 215 (1 . . . M) as an output destination via re-reflection in the concave mirror 240 and the diffraction grating 225.

FIG. 17 shows a structure example of each reverse reflector 230 (1 . . . N). Each of the reverse reflectors 230 (1 . . . N) can have a structure denoted with numeral 230e in FIG. 17. The reverse reflector 230e comprises a prism 269 and two MEMS mirror arrays 262 and 263 directly contacted on the right-angle faces of the prism 269. In the MEMS mirror array 263, M MEMS mirrors 266 (1 . . . M) for coupling a reflected light to the optical fiber 215 (1 . . . M) as the output destination are arranged, and the MEMS mirrors 265 in the MEMS mirror array 262 are controlled an inclination angle thereof in order to reflect a light beam from the concave mirror 240 on any one of the MEMS mirrors 266 (1 . . . M).

However, there is a problem that the size of the optical switch 102A described in U.S. Pat. No. 6,707,959 is relatively large.

Specifically, when being spectrally diffracted, a wavelength-multiplexed light beam input into the diffraction grating 124 is output in a direction different from the incident direction of the wavelength-multiplexed light beam, that is, in a direction different from the input light beam about the axis 120A of the concave mirror 120. Therefore, the MEMS mirror array 126 for switching the reflecting direction of a light beam for each wavelength requires to be provided at the opposite side to the input/output unit 122 about the diffraction grating 124. As a result, it is necessary to provide a relatively large space totally for arranging the optical members 122, 120, 124 and 126 constituting the optical switch 102A, and thus the size of the optical switch 102A is accordingly large.

On the contrary, in the wavelength router 210 described in U.S. Pat. No. 6,439,728, when being spectrally diffracted, a wavelength-multiplexed light beam input into the diffraction grating 225 can be reflected in a direction substantially identical to the incident direction of the wavelength-multiplexed light beam. Thus, though the reverse reflector 230 corresponding to the MEMS mirror array 126 shown in FIG. 13 can be provided at the same side as the optical fibers 212 and 215 corresponding to the input/output unit 122 and the diffraction grating 225. However since the number of MEMS mirrors required in each reverse reflector 230 increases, the structure becomes complicated and the size of the member itself also becomes larger, thereby causing a problem in down-sizing or causing interference of the arrangement position between the optical fibers 212 and 215 and the reverse reflectors 230.

SUMMARY OF THE INVENTION

It is an object of the present invention to provide an optical switch capable of reducing an apparatus size without making a structure for switching an output path complicated.

Therefore, an optical switch according to the present invention comprises a plurality of input/output ports arranged in parallel, first and second reflecting members, a diffraction grating unit for defining an output angle of an output light for an incident light wavelength component through diffraction, and a micromirror array, wherein the first reflecting member optically couples the input/output ports and the second reflecting member, the second reflecting member is arranged so that a reflecting face thereof is opposed to the first reflecting member, the diffraction grating unit and the micromirror array, optically couples the first reflecting member and the diffraction grating unit for input lights from the input/output ports and output lights to the input/output ports, and optically couples the diffraction grating unit and the micromirror array for wavelength component lights spectrally diffracted into wavelength components, when input lights from the input/output ports are incident via the first and second reflecting members, the diffraction grating unit outputs the wavelength component lights as the output lights, the micromirror array comprises micromirrors capable of reflecting respective wavelength component lights from the diffraction grating unit and switching directions of the reflections according to an arrangement of input/output ports as output destinations, the diffraction grating unit outputs the output lights as the output lights according to an arrangement of input/output ports as output destinations based on the reflecting directions of the wavelength component lights switched in the micromirror array, and the first reflecting member and the micromirror array, which are optically coupled with the diffraction grating unit through the second reflecting member, are arranged at the same side relative to the diffraction grating unit.

Further, in the optical switch, the second reflecting member may be constituted of a concave mirror, and the micromirror array and the diffraction grating unit may be arranged to be a substantial focal position of the concave mirror.

In this case, the concave mirror may be a rear mirror which forms reflecting material at a rear face of an optical transmitting member.

Further, the first reflecting member may be constituted of a convex mirror, and the convex mirror may be arranged to have an imaginary focal position on the same plane as the micromirror array.

In this case, the convex mirror may be a rear mirror which forms reflecting material at a rear face of an optical transmitting member.

Preferably, an optical device for expanding beam diameters of input lights may be mounted at the front stage where the input lights from the input/output ports are input into the first reflecting member.

The plurality of input/output ports each comprise a plurality of optical fibers arranged in parallel, and a lens unit for optically coupling each optical fiber and the first reflecting member.

The diffraction grating unit may be composed of a reflective diffraction grating.

The diffraction grating unit may be constituted of a transmission diffraction grating and a third reflecting member for reflecting lights transmitted through the transmission diffraction grating and returning the lights to the transmission diffraction grating. In this case, the third reflecting member may form a reflector at a rear face of a λ/4 wavelength plate.

A λ/4 wavelength plate may be mounted on an optical path between the micromirror array and the diffraction grating unit for the wavelength component lights.

Further, the second reflecting member may be constituted of a concave mirror, and an optical member for correcting a field curvature of wavelength component lights reflected toward the micromirror array at the second reflecting member may be mounted on an optical path between the second reflecting member and the micromirror array.

Further, the optical switch according to the present invention comprises a plurality of input/output ports arranged in parallel, first and second reflecting members, a diffraction grating unit for defining an output angle of an output light for an incident light wavelength component, and a micromirror array, wherein the first reflecting member reflects input lights from the input/output ports toward the second reflecting member, the second reflecting member is arranged so that a reflecting face thereof is opposed to the first reflecting member, the diffraction grating unit and the micromirror array, and reflects the input lights from the first reflecting member toward the diffraction grating unit, when the input lights from the second reflecting member are incident as the incident lights, the diffraction grating unit outputs wavelength component lights whose output angles are different for each wavelength component as the output lights, the second reflecting member further reflects each wavelength component light from the diffraction grating unit toward the micromirror array, the micromirror array comprises micromirrors capable of reflecting respective wavelength component lights from the diffraction grating unit and switching directions of the reflections according to an arrangement of input/output ports as output destinations, the diffraction grating unit is further incident with reflecting lights from the micromirror array via the second reflecting member, and bundles and outputs wavelength components according to the reflecting directions switched in the micromirror array, the second reflecting member further reflects lights whose wavelength components are bundled in the diffraction grating unit as output lights toward the first reflecting member, the first reflecting member further guides the output lights from the second reflecting member to corresponding input/output ports, and the first reflecting member and the micromirror array, which are optically coupled with the diffraction grating unit via the second reflecting member, are arranged at the same side relative to the diffraction grating unit.

Furthermore, the optical switch according to the present invention comprises a curved reflecting unit comprising a curved reflecting face, a movable mirror array unit comprising a plurality of movable mirrors opposed to the reflecting face, a reflecting unit provided between the curved reflecting unit and the movable mirror array unit and comprising a reflecting face opposed to the curved reflecting face, a wavelength dispersing unit for directing lights sequentially reflected in the reflecting unit and the curved reflecting unit at an angle different for each wavelength and giving the same to the curved reflecting unit, and a controller for controlling reflecting faces of the mirrors of the movable mirror array unit such that wavelength components of a light, which is input from any one port among a plurality of ports provided at the reflecting face of the reflecting unit and is given to the wavelength dispersing unit via the curved reflecting unit to be wavelength-dispersed, are output in a direction different from the one port.

As described above, according to the optical switch according to the present invention, it is advantageous that the first reflecting member can remarkably reduce the apparatus size without making the structure for switching an output path complicated.

DESCRIPTION OF THE PREFERRED EMBODIMENTS

Embodiments according to the present invention will be described below with reference to the drawings.

In addition to the above object of the present invention, other technical objects, means for solving the technical objects and operational effects thereof will be apparent from the disclosure of the following embodiments.

[A] Description of First Embodiment

[A1] Structure

Figure 1:
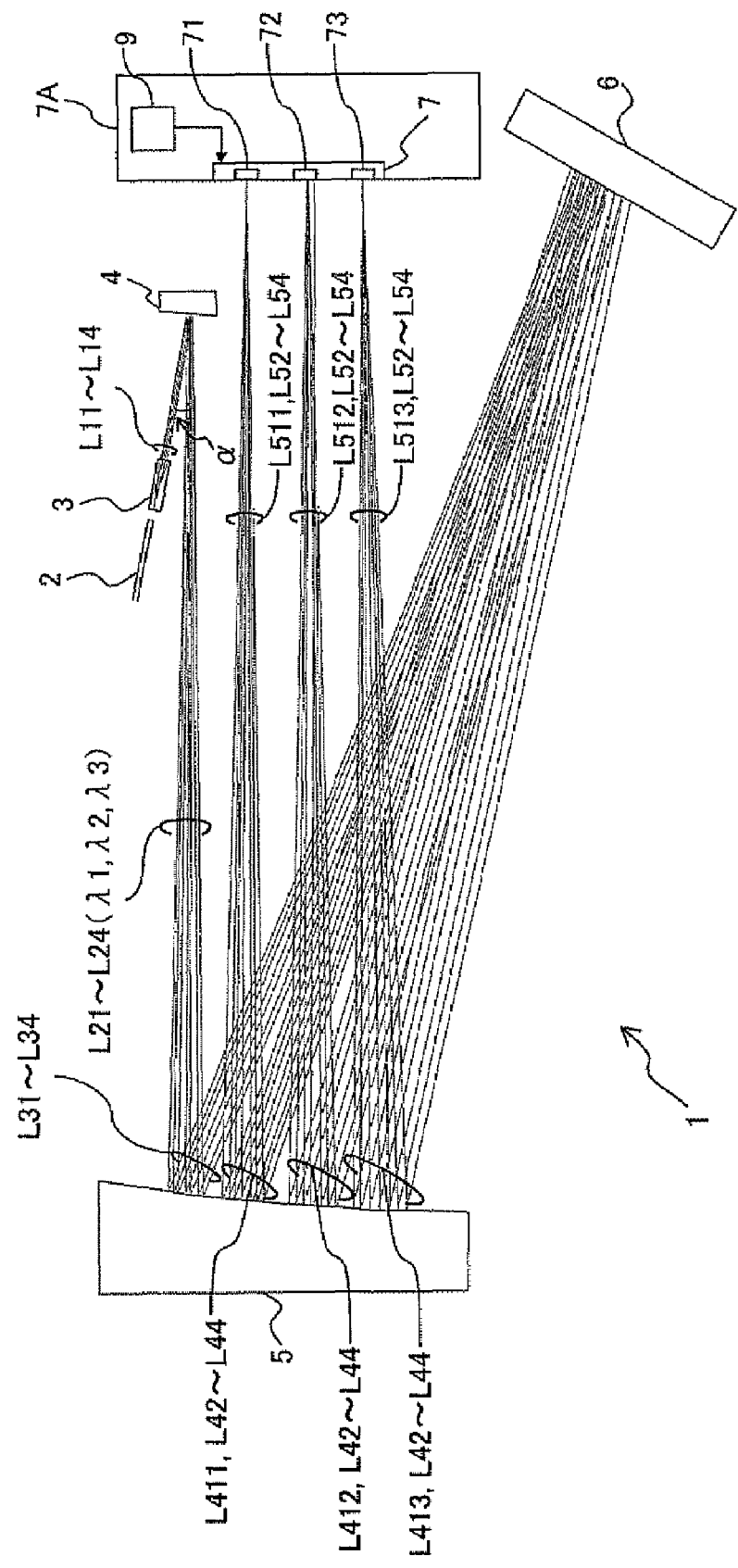
FIG. 1 is a top schematic view showing an optical switch according to a first embodiment of the present invention.

FIG. 1 is a top schematic view showing an optical switch 1 according to a first embodiment of the present invention. The optical switch 1 shown in FIG. 1 has a function capable of selectively outputting an input wavelength-multiplexed signal to an arbitrary output port for each wavelength, and comprises a fiber array 2, a collimate lens array 3, a convex mirror 4, a concave mirror 5, a diffraction grating 6 and a MEMS mirror array 7. The first embodiment assumes that when a wavelength-multiplexed signal having three kinds of center wavelengths λ1 to λ3 is input from one input port, the components of these wavelengths λ1 to λ3 are output to output ports, respectively.

Figure 2:
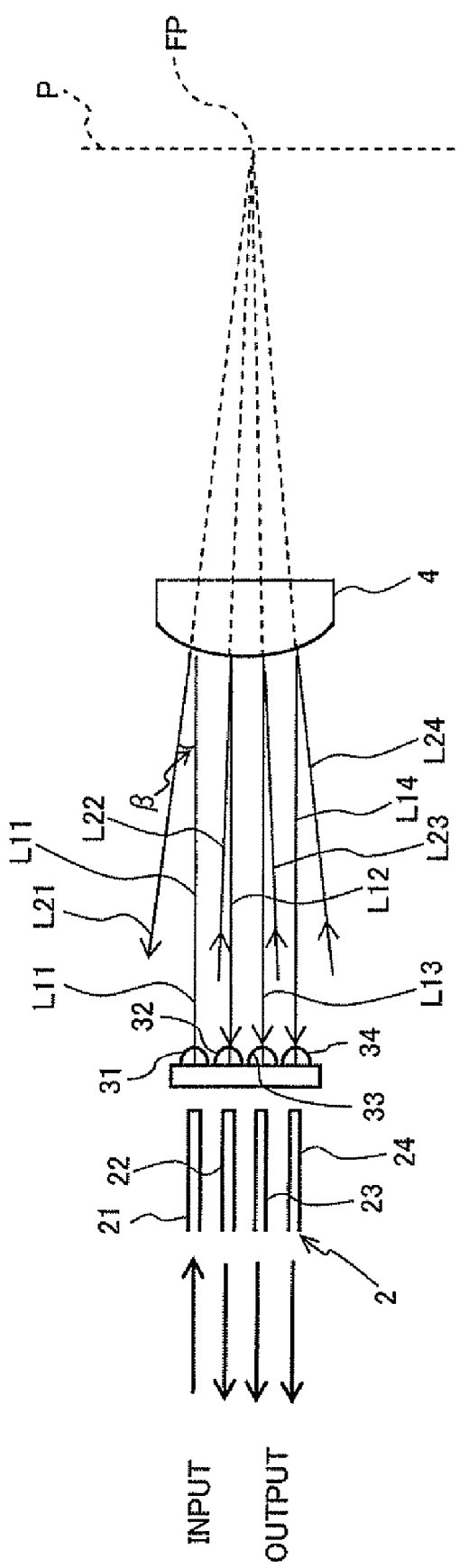
FIG. 2 is a front schematic view mainly showing a fiber array, a collimate lens array and a convex mirror constituting the optical switch in FIG. 1.
Figure 3:
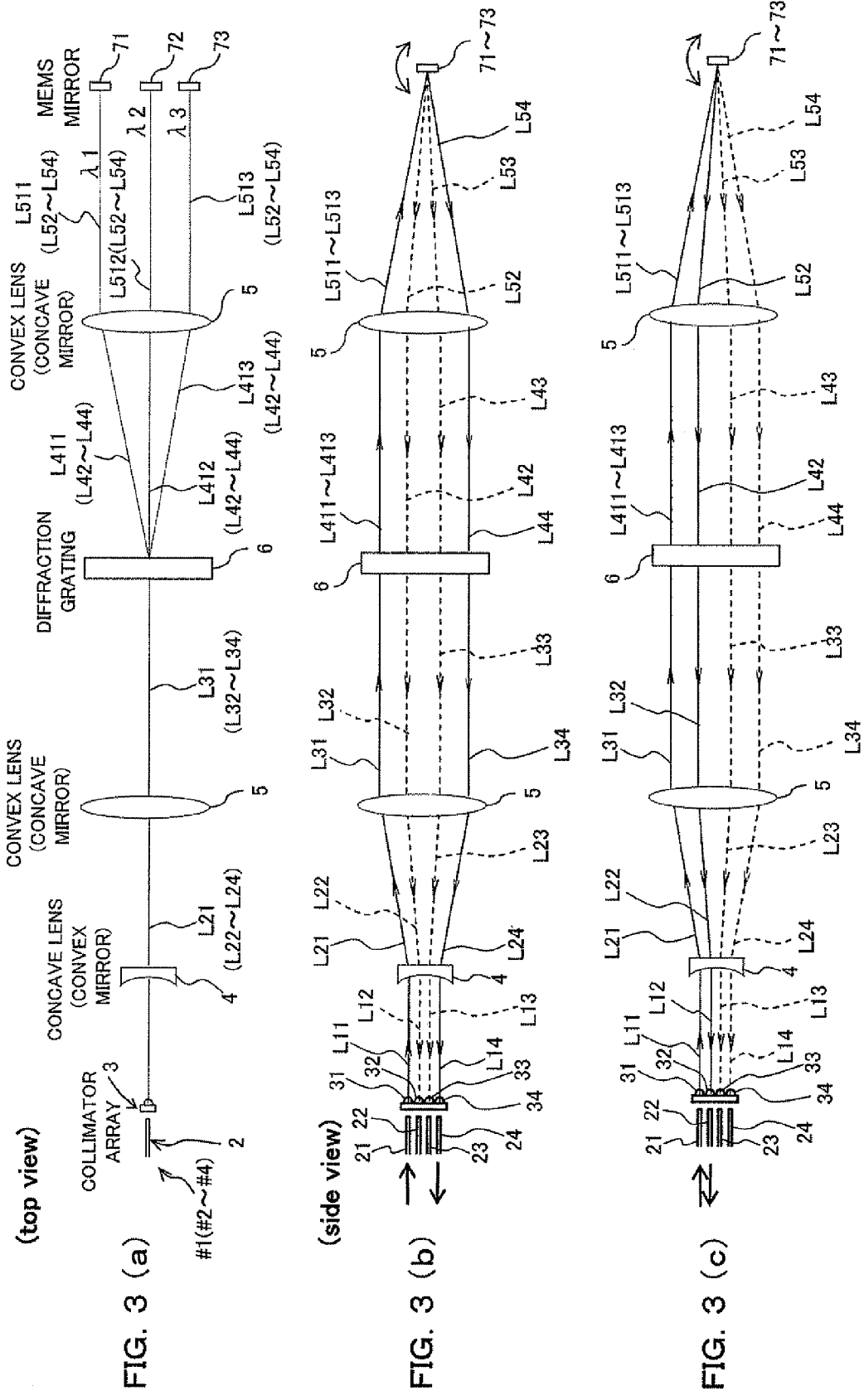
FIGS. 3(a) to 3(c) show an equivalent optical system where the optical systems constituting the optical switch are replaced with lens optical systems.

FIG. 2 is a front schematic view mainly showing the fiber array 2, the collimate lens array 3 and the convex mirror 4 constituting the optical switch 1 in FIG. 1, and FIGS. 3(a) to 3(c) show an equivalent optical system where the optical systems constituting the optical switch 1 are replaced with lens optical systems, where FIG. 3(a) shows the equivalent optical system of the optical switch 1 viewed from the upper direction similarly as in FIG. 1, and FIGS. 3(b) and 3(c) show the equivalent optical system of the optical switch viewed from the front direction similarly as in FIG. 2. Specifically, FIGS. 3(a) to 3(c) illustrate the convex mirror 4 as a concave lens and the concave mirror 5 as a convex lens.

In the fiber array 2, as illustrated in FIGS. 2, 3(b) and 3(c), a plurality of (in this case, four) optical fibers 21 to 24 are arranged in parallel. The collimate lens array 3 is a lens unit for optically coupling each optical fiber 21 to 24 and the convex mirror 4, and is constituted of the collimate lenses 31 to 34 where an end face position of each optical fiber 21 to 24 constituting the fiber array 2 is arranged in parallel to be a focal distance. The optical fibers 21 to 24 and the collimate lenses 31 to 34 are arranged in parallel in a direction perpendicular to the sheet in FIG. 1.

The respective pairs of the several optical fibers 21 to 24 and the corresponding collimate lenses 31 to 34 can constitute four input/output ports arranged in parallel. In the optical switch 1 according to the first embodiment, a pair of the optical fiber 21 and the collimate lens 31 is denoted as an input port #1, and the respective pairs of the optical fibers 22 to 24 and the corresponding collimate lenses 32 to 34 are denoted as output ports #2 to #4, respectively. That is, a light input from the optical fiber 21 (an input light) is made to be a parallel light in the collimate lens 31 and is output to the convex mirror 4 at the rear stage.

The convex mirror 4 is a reflecting unit which is provided between the concave mirror 5 and the MEMS mirror array 7 and comprises a reflecting face opposed to the reflecting face of the concave mirror 5. Furthermore, the convex mirror 4 is a first reflecting member for optically coupling the collimate lenses 31 to 34 constituting the input/output ports #1 to #4 and the concave mirror 5, and reflects an input light from the collimate lens 31 toward the concave mirror 5. At this time, when the input light is reflected on the convex mirror 4, the beam diameter thereof is expanded as shown in FIG. 1 and the input light propagates with an angle. Specifically, as viewed from the upper direction in FIG. 1, a reflecting angel a is given to the input light, which is output to the concave mirror 5, and as viewed from the front direction in FIGS. 2, 3(b) and 3(c), a reflecting angle β is given to the input light according to an incident position relative to the convex mirror 4, which is output to the concave mirror 5 (refer to a reflected light L21).

The concave mirror 5 is a curved reflecting unit comprising a curved reflecting face, and is a second reflecting member whose reflecting face is arranged to be opposed to the convex mirror 4, the diffraction grating 6 and the MEMS mirror array 7, which reflects the light L21 from the convex mirror 4 toward the diffraction grating 6 as a collimated light L31. That is, as shown in FIGS. 3(b) and 3(c), the input light L21 given with the angle β is output toward the diffraction grating 6 as the light L31 as the parallel light.

The diffraction grating (diffraction grating unit) 6 is a wavelength dispersing unit for directing a light sequentially reflected on the convex mirror 4 and the concave mirror 5 in a different direction according to a wavelength and giving the same to the concave mirror 5. This diffraction grating 6 is arranged substantially at a focal position of the concave mirror 5, and defines an output angle of the output light relative to an incident light wavelength component through the diffraction, which is constituted of a reflective diffraction grating for Littrow configuration according to the first embodiment. Specifically, when the light L31 is incident from the concave mirror 5, as shown in FIG. 1 or 3(a) to 3(c), the wavelength component lights L411 to L413 whose output angles are different for each wavelength component λ1 to λ3 are output as the output lights and are returned to the concave mirror 5.

The concave mirror 5 further reflects the respective wavelength component lights L411 to L413 from the diffraction grating 6 [refer to L511 to L513 in FIG. 1 or FIGS. 3(a) to 3(c)], and focuses the lights on the reflecting faces of the MEMS mirrors 71 to 73 constituting the MEMS mirror array 7 as the substantial focal points, respectively.

The MEMS mirror array (micro mirror array) 7 is a unit comprising the MEMS mirrors 71 to 73 as a plurality of movable mirrors opposed to the reflecting face of the concave mirror 5. The MEMS mirrors 71 to 73 in the MEMS mirror array 7 are arranged substantially at the focal position of the concave mirror 5. The MEMS mirrors 71 to 73 reflect the wavelength component lights L511 to L513 from the diffraction grating 6, respectively. The inclination angles of the reflecting faces are controlled so that the reflected lights L52 to L54 whose reflecting directions are switched in correspondence to the arrangement of the input/output ports #2 to #4 as the output destinations can be obtained. The directions to which the reflecting directions are to switch and the directions in which the wavelength component lights L411 to L413 expand in the diffraction grating 6 are substantially perpendicular to each other, respectively.

The controller 9 controls the reflecting faces of the mirrors 71 to 73 in the MEMS mirror array 7 such that the wavelength components of the wavelength-dispersed light, which is input from the input port #1 provided at the reflecting face side of the convex mirror 4 and is given to the diffraction grating 6 via the convex mirror 4 and the concave mirror 5, is output in a direction different from the input port #1. That is, in the controller 9, the reflecting angles of the mirrors 71 to 73 are individually controlled so that any one of the output ports #2 to #4 can be set as an output path for a light input from the input port #1 for each wavelength component light L51 to L53 wavelength-dispersed in the diffraction grating 6.

FIG. 3(b) shows a case where the reflected lights on the MEMS mirrors 71 to 73 are assumed as L54 in order to assume the output destination of the wavelength component lights L511 to L513 of λ1 to λ3 as the output port #4, where the optical paths (refer to L52 and L53) when the output destinations are assumed as the output ports #2 and #3 are illustrated in dotted lines. FIG. 3(c) shows a case where the reflected lights on the MEMS mirrors 71 to 73 are assumed as L52 in order to assume the output destination of the wavelength component lights L511 to L513 of λ1 to λ3 as the output port #2, where the optical paths (refer to L53 and L54) when the output destinations are assumed as the output ports #3 and #4 are illustrated in dotted lines.

That is, the MEMS mirrors 71 to 73 reflect the lights with the inclination angle of the reflecting faces as shown in FIG. 3(b) so that when each wavelength component light is incident into the convex mirror 4, the reflected light L54 having the reflecting angle as the light L24 having an angle to be coupled to the output port #4 can be obtained. Similarly, when the MEMS mirrors reflect the lights with the inclination angle of the reflecting faces as shown in FIG. 3(c), the reflected light L52 having the reflecting angle as the light L22 having an angle to be coupled to the output port #2 can be obtained when being incident into the convex mirror 4.

The concave mirror 5 reflects the lights L52 to L54 whose reflecting angles are switched in the MEMS mirrors 71 to 73 toward the diffraction grating 6 as the collimate lights L42 to L44. A reflected light from the MEMS mirror array 7 is incident into the diffraction grating 6 via the concave mirror 5 and the wavelength components thereof are bundled and output according to the reflecting directions switched in the MEMS mirrors 71 to 73 [refer to the lights L32 to L34 in FIGS. 3(a) to 3(c)].

The concave mirror 5 further focuses the lights L32 to L34 whose wavelength components are bundled in the diffraction grating 6, and reflects the same toward the convex mirror 4 as the output lights L22 to L24. The convex mirror 4 further reflects the output lights L22 to L24 from the concave mirror 5 to guide the same to the corresponding input/output ports #2 to #4. That is, the reflected lights L12 to L14 corresponding to the output lights L22 to L24 from the concave mirror 5 trace the mutually-parallel optical paths according to the incident angles relative to the convex mirror 4 to be guided to the collimate lenses 32 to 34 constituting the mutually different output ports #2 to #4, respectively.

At this time, an imaginary focal point FP of the convex mirror 4 is arranged to be substantially present on the same plane as the reflecting faces P of the MEMS mirrors 71 to 73 (to be substantially arranged on the reflecting face P) as shown in FIG. 2. Since the plane of the MEMS mirror array 7 on which the imaginary focal point FP of this convex mirror 4 is arranged substantially corresponds to the focal distance of the concave mirror 5, the optical axes of the reflected lights L12 to L14 relative to the lights L22 to L24 can be made to be mutually parallel.

That is, the convex mirror 4 can correspond the angle displacements of the lights L21 to L24 which propagate between the convex mirror 4 and the concave mirror 5 to the angle displacements of the MEMS mirrors 71 to 73. The convex mirror 4 can have a function of mutually switching the positions of the optical axes of the lights L11 to L14 at the input/output ports and the angle displacements of the lights L21 to L24 at the concave mirror 5.

The concave mirror 5 has a function capable of optically coupling the convex mirror 4 and the diffraction grating 6 for the light from the input port #1 and the output lights to the output ports #2 to #4, and optically coupling the diffraction grating 6 and the micro mirror array for the wavelength component light spectrally diffracted into wavelength components.

Specifically, the input light L21 reflected on the convex mirror 4 is reflected toward the reflective diffraction grating 6 as the collimated light 31, and lights L32 to L34 whose wavelength components are bundled in the diffraction grating 6 are output to the convex mirror 4 as the output lights L22 to L24. On the other hand, the wavelength component lights L411 to L413 spectrally diffracted in the diffraction grating 6 are reflected toward the MEMS mirrors 71 to 73 as the lights L511 to L513, respectively, and the lights L52 to L54 reflected on the MEMS mirrors 71 to 73 are output to the diffraction grating 6 as the lights L42 to L44 focused for each wavelength component.

[A2] Operational Effects

In the optical switch 1 according to the first embodiment of the present invention having the above structure, a wavelength-multiplexed light from the optical fiber 21 constituting the input port #1 is made to be a collimated beam L11 in the collimate lens 31 and is reflected on the convex mirror 4 so that the beam diameter thereof is expanded as shown in FIG. 1, and further propagates as the reflected light L21 given with an angle as shown in FIGS. 1 and 2.

The concave mirror 5 collimates the incident light L21 and the diffraction grating 6 reflects the light L31 from the concave mirror 5 to be the light beams L411 to L413 whose wavelengths are separated. The light beams L411 to L413 are reflected and focused again in the concave mirror 5 and direct to the MEMS mirrors 71 to 73 different for each wavelength. The lights reflected on the respective MEMS mirrors 71 to 73 reversely trace the same paths to be combined in the diffraction grating 6, and direct toward the output fibers 22 to 24 according to the reflecting angles set in the MEMS mirrors 71 to 73.

That is, the angles of the MEMS mirrors 71 to 73 are individually controlled so that a light of each wavelength can be directed toward the individually selected output fibers 22 to 24, thereby realizing the wavelength selecting operation.

Though the optical fiber array 2 and the collimate lens array 3 constituting the input/output ports #1 to #4 require to be arranged at a position as the focal distance of the concave mirror 5, when the input/output ports #1 to #4 are optically coupled to the concave mirror 5 not via the convex mirror 4, interference with the arrangement position of the MEMS mirror array 7 occurs. Since the MEMS mirror array 7 is actually arranged as a MEMS mirror package 7A packaged to include an electric circuit unit (controller 9) for controlling the inclination angles of the MEMS mirrors 71 to 73 as shown in FIG. 1, it is more important that the arrangement position of the input/output ports #1 to #4 does not interfere with the MEMS mirror package 7A.

Figure 13:
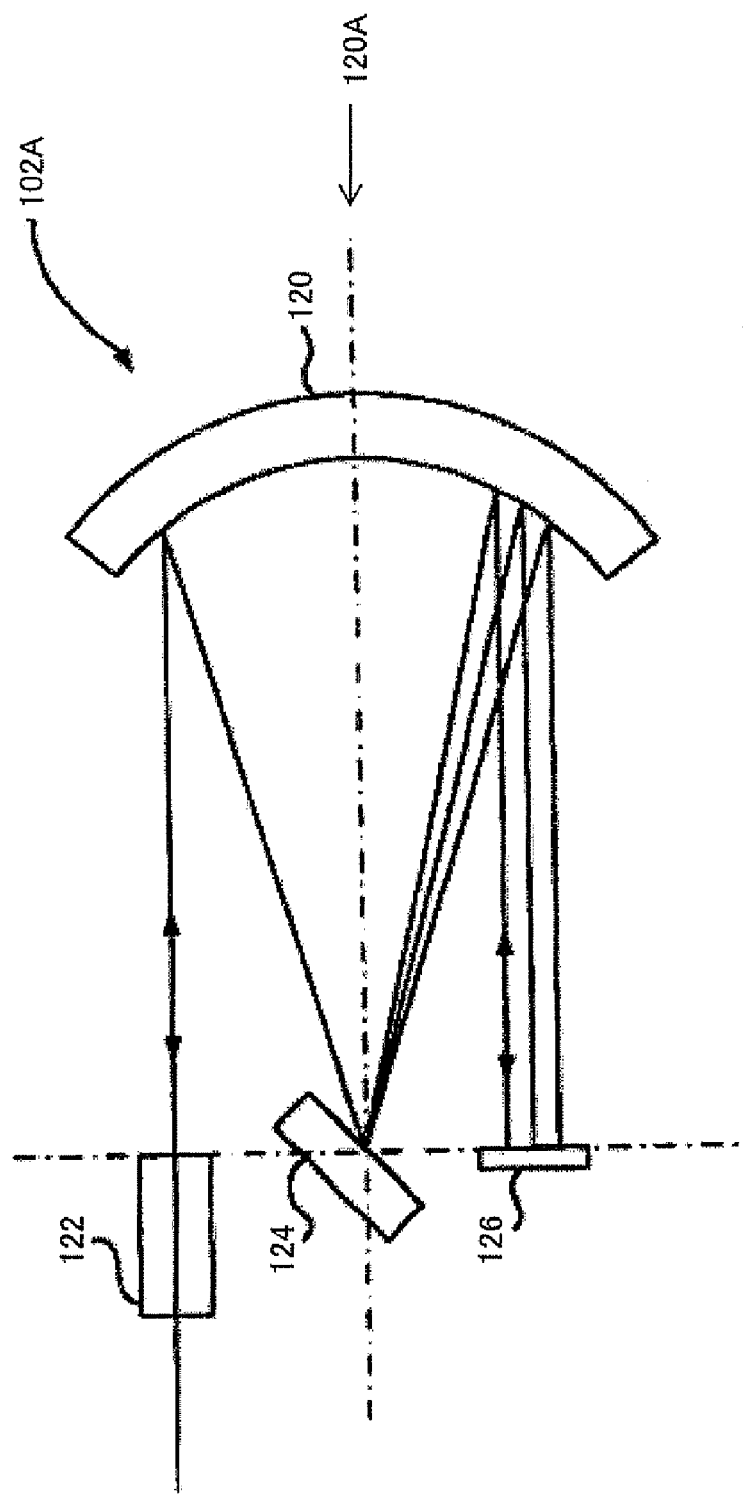
FIGS. 13 to 17 are diagrams showing a conventional art.
Figure 14:
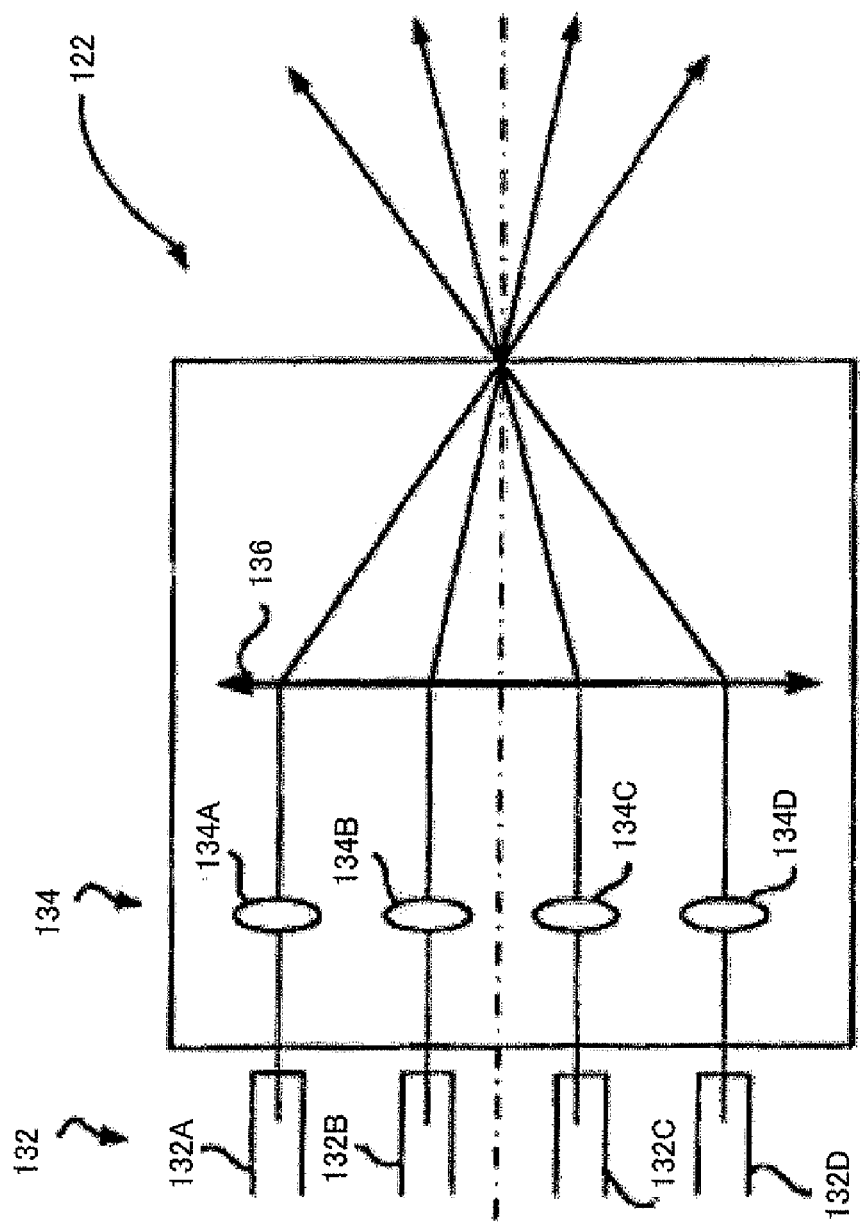
Figure 15:
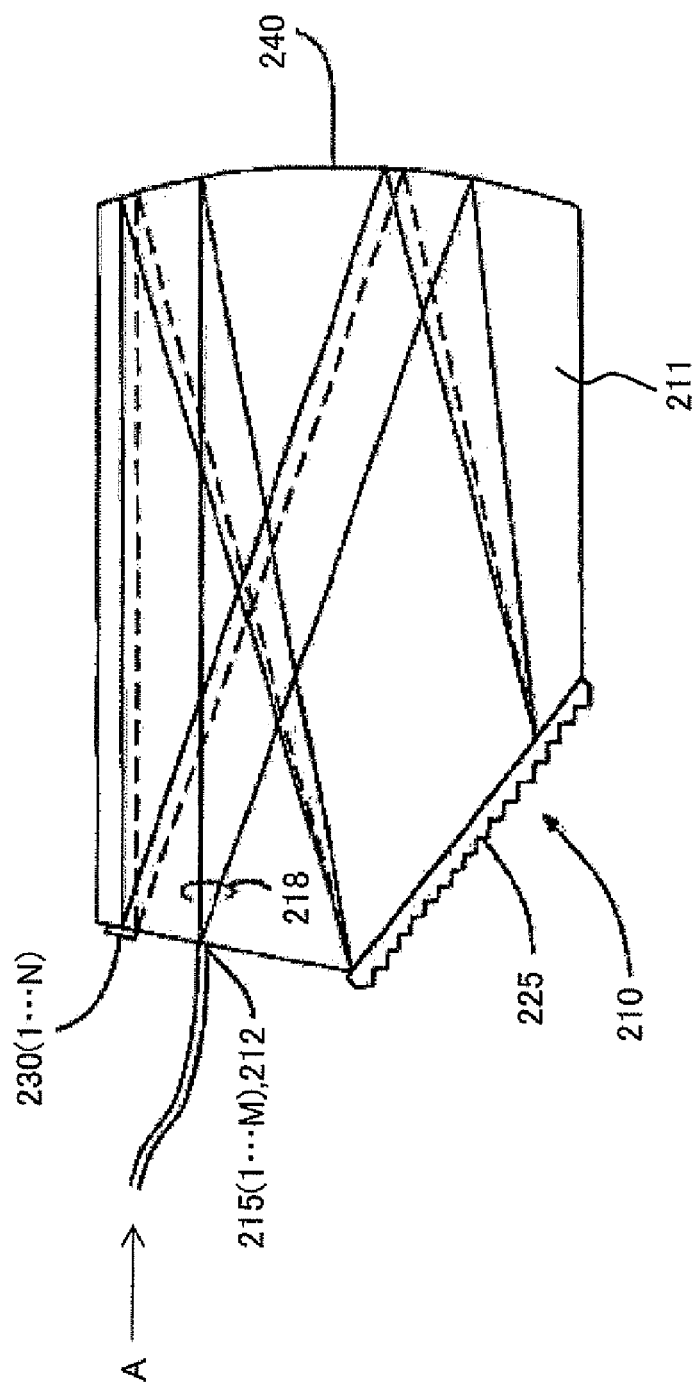

In the optical switch 1 according to the first embodiment, since the input/output ports #1 to #4 and the concave mirror 5 are optically coupled via the reflecting on the convex mirror 4 as the first reflecting member, a degree of freedom can be provided to the arrangement position of the input/output ports #1 to #4, thereby securely constituting an optical switch compacter than the optical switch shown in FIG. 13.

Figure 17:
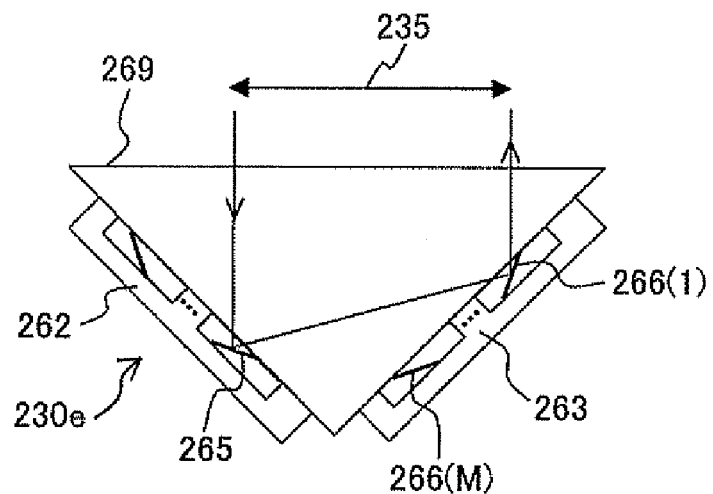
Figure 16:
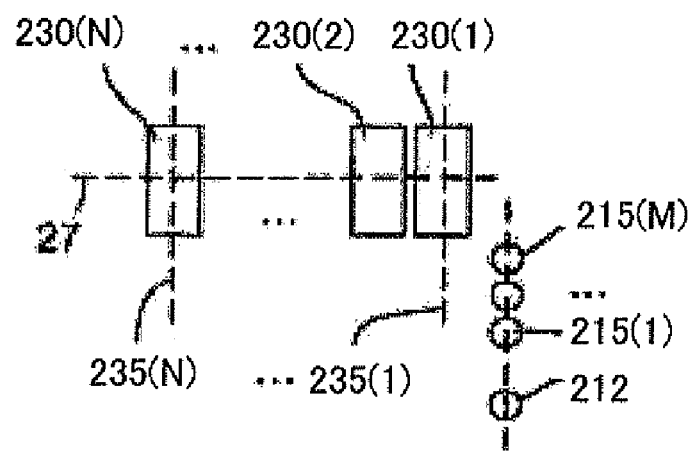

The convex mirror 4 can perform position/angle conversion, that is, can convert the optical axes parallel to the optical fibers 21 to 24 [refer to L11 to L14 in FIGS. 3(b) and 3(c)] to the different optical axes (refer to L21 to L24 in the same figures) of the respective angles. As a result, the optical axes can be switched only by the angle adjustments of the MEMS mirrors 71 to 73 so that the mechanism for switching an output path (refer to numeral 230) can be remarkably made compact as compared with that shown in FIG. 17, thereby entirely reducing the apparatus size.

In this manner, according to the first embodiment of the present invention, it is advantageous that the convex mirror 4 as the first reflecting member can remarkably reduce the apparatus size without making the structure for switching an output path complicated.

[B] Description of Second Embodiment

Figure 4:
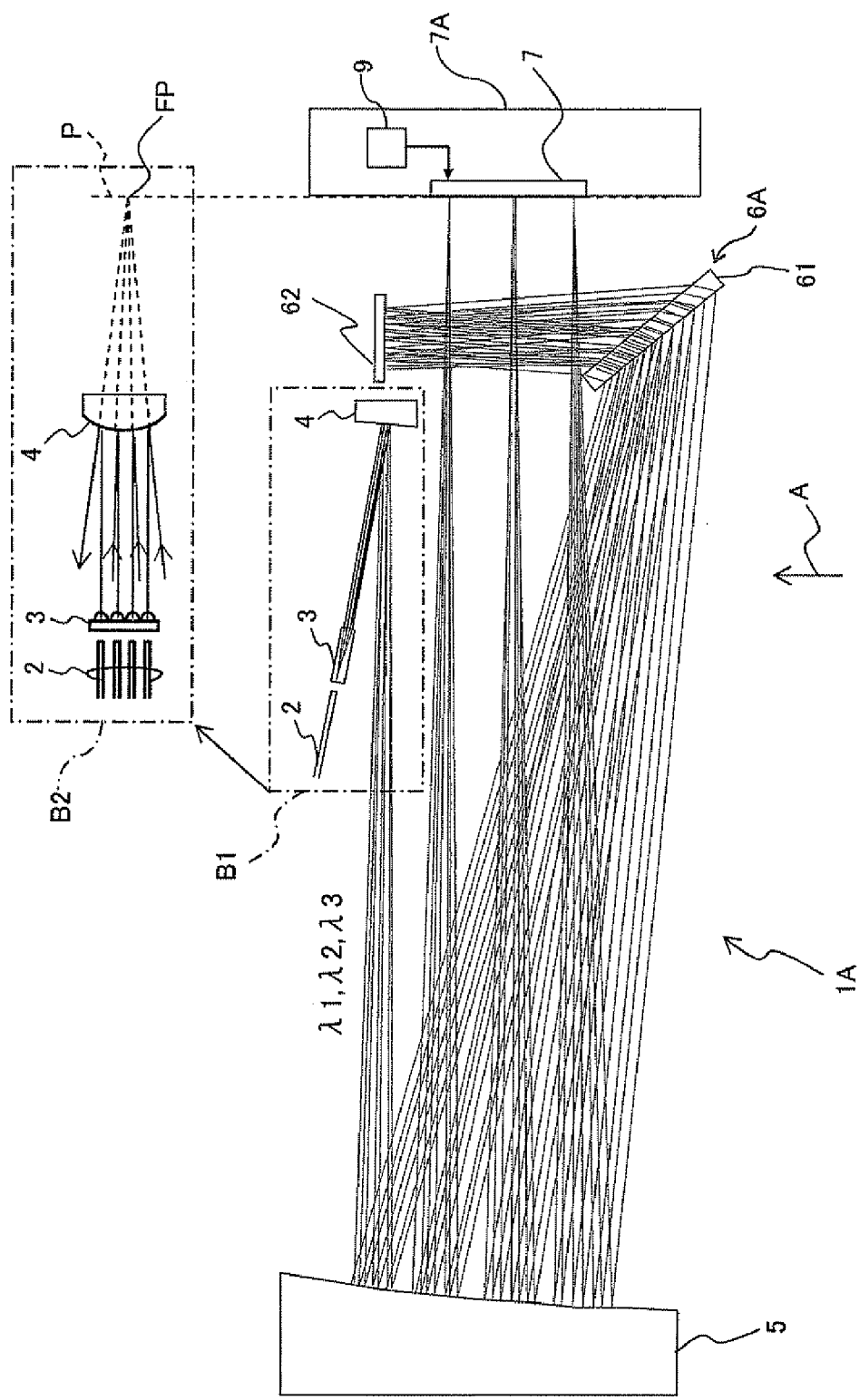
FIG. 4 is a top schematic view showing an optical switch according to a second embodiment of the present invention.

FIG. 4 is a top schematic view showing an optical switch 1A according to a second embodiment of the present invention. The optical switch 1A shown in FIG. 4 is different from the optical switch 1 according to the first embodiment in the structure as the diffraction grating unit, but is basically similar thereto in other structure. In FIG. 4, like numerals identical to those in FIG. 1 denote substantially like portions, and a portion B2 surrounded by a dashed line in the figure illustrates a portion B1 similarly surrounded by a dashed line (the optical fiber array 2, the collimate lens array 3 and the convex mirror 4) from the direction of an arrow A and corresponds to FIG. 2.

A diffraction grating unit 6A is constituted of a transmission diffraction grating 61 and a reflecting mirror 62. The reflecting mirror 62 is a third reflecting member for reflecting a light transmitting through the transmission diffraction grating 61 and returning the same to the transmission diffraction grating 61, and an optical path length relative to the concave mirror 5 is arranged substantially at the focal distance of the concave mirror 5.

In the optical switch 1 according to the first embodiment, the reflective diffraction grating 6 and the MEMS mirrors 71 to 73 require to be arranged at positions substantially corresponding to the focal distance of the concave mirror 5, but interference of the arrangement positions between the diffraction grating 6 and the MEMS mirror package 7A may occur.

As in the second embodiment, the transmission diffraction grating 61 and the reflecting mirror 62 are provided as the diffraction grating unit 6A so that the optical path is folded inward in the diffraction grating 61 and the reflecting mirror 62is arranged at a position where no failure occurs in the optical coupling state constituting the convex mirror 4 and the optical switch 1A, thereby promoting the reduction in the entire size of the optical switch 1A. That is, the diffraction grating 61 can be arranged without interfering with the MEMS mirror package 7A, thereby further reducing the size of the entire optical system.

When a light which is spectrally diffracted for a wavelength-multiplexed light from the concave mirror 5 is returned to the concave mirror 5, the light goes on and back through the diffraction grating 61 twice so that the spectrally-diffracted light is further spectrally diffracted and the wavelength dispersion angle thereof is also made larger. Thus, a distance from the diffraction grating 61 to the concave mirror 5 can be shortened, thereby further reducing the size.

In this manner, according to the second embodiment, similarly as in the first embodiment, it is advantageous that the convex mirror 4 as the first reflecting member can remarkably reduce the apparatus size without making the structure for switching an output path complicated and that the transmission diffraction grating 61 and the reflecting mirror 62 as the diffraction grating unit 6A can further reduce the entire size of the optical switch 1A.

[C] Description of Third Embodiment

Figure 5:
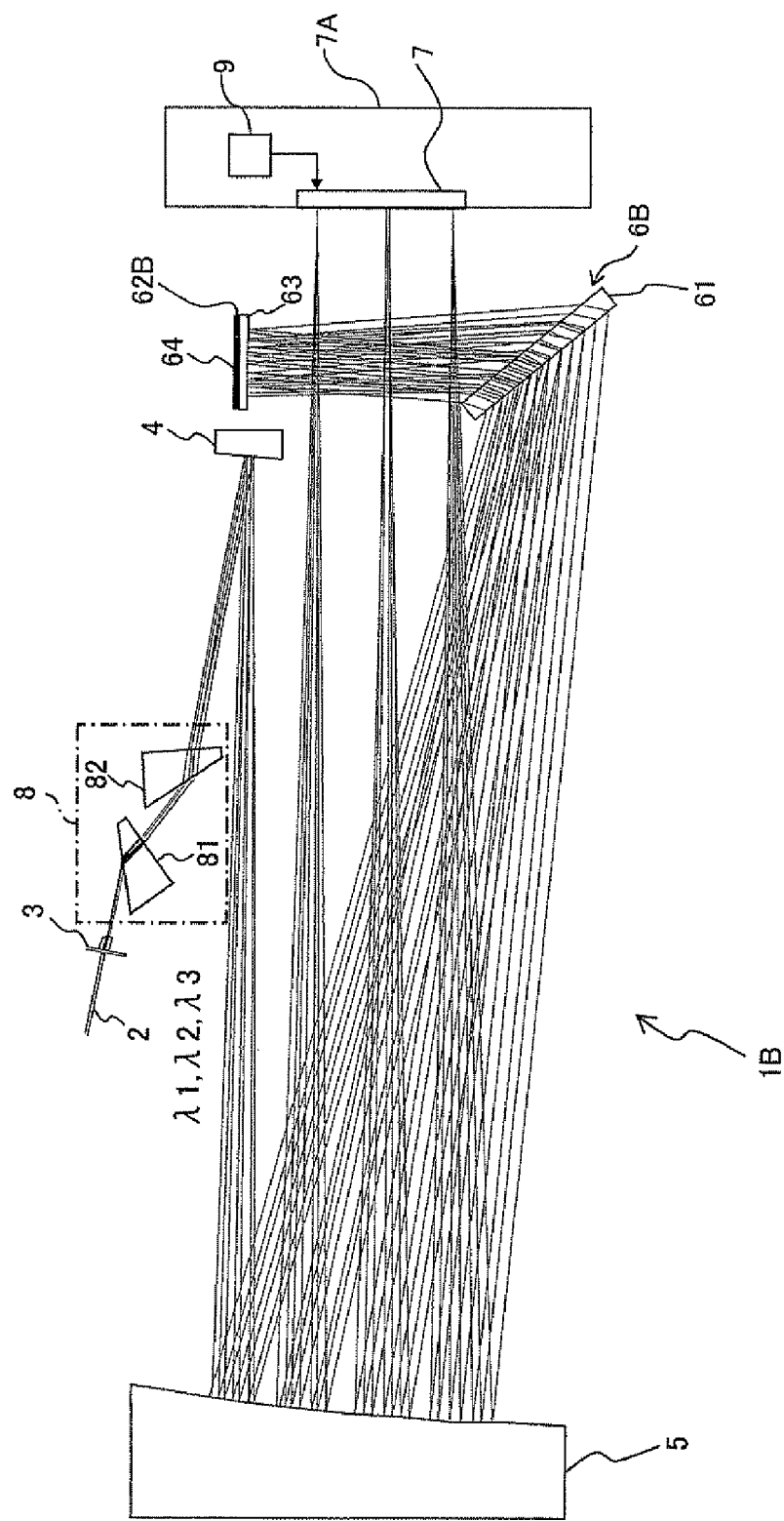
FIG. 5 is a top schematic view showing an optical switch according to a third embodiment of the present invention.

FIG. 5 is a top schematic view showing an optical switch 1B according to a third embodiment of the present invention. The optical switch 1B shown in FIG. 5 is different from the optical switch 1A shown in FIG. 4 in that a structure of a reflecting mirror 62B constituting a diffraction grating unit 6B is different from the reflecting mirror 62B as the corresponding constituent in FIG. 4 and an optical device 8 for expanding a beam diameter of an input light is provided between the collimate lens array 3 and the convex mirror 4. Other structure is substantially identical to that according to the second embodiment, and in FIG. 5, like numerals identical to those in FIG. 4 denote substantially like portions.

The optical device 8 is directed for changing a beam shape from a Gaussian beam shape to an elliptical shape such that the beam diameter expands in a direction in which a wavelength-multiplexed light as an input light is spectrally diffracted in the diffraction grating unit 6B. As illustrated in FIG. 5, the optical device 8 may be constituted of an anamorphic prism pair as a pair of anamorphic prisms 81 and 82 or may be constituted of a cylindrical lens.

That is, the beam diameters of lights incident into the MEMS mirrors 71 to 73 are reduced in the arrangement direction of the MEMS mirrors 71 to 73, thereby achieving increase in the wavelength range to pass through, increase in the number of signal channel wavelengths, and narrowing of the channel wavelength interval for the optical switch 1B. The optical device 8 increases the beam diameter of a light from the collimate lens array 3 to the convex mirror 4, which is a light at the front stage for focusing in the concave mirror 5, thereby reducing the beam diameters of the lights in the arrangement direction of the MEMS mirrors 71 to 73 when being incident into the MEMS mirrors 71 to 73.

On the other hand, the beam diameter is not expanded in the direction in which the optical fibers 21 to 24 are arranged, thereby restricting occurrence of cross talk between the ports. In this manner, it is desirable in the optical device 8 that the beam diameter is expanded only in the direction in which the diffraction grating unit 6B diffracts (or in the arrangement direction of the MEMS mirrors 71 to 73).

As shown in FIG. 5, the reflecting mirror 62B is constituted so that the reflector 64 such as dielectric multi-layer film is coated on the rear face of a $\lambda/4$ wavelength plate 63, wherein a polarizing component of the reflected light is rotated at about 90° relative to the incident light. Thus, it is possible to reduce the polarization dependency of the diffraction efficiency of the diffraction grating 61.

That is, since the diffraction grating 61 typically has the polarization dependency and has the diffraction efficiency different between a vertical polarization and a horizontal polarization, the loss thereof is different depending on the polarization state of a light input into the optical switch 1B. In the optical switch 1B according to the third embodiment, though spectrally diffracting and wavelength combining are performed in the diffraction grating 61, the $\lambda/4$ wavelength plate 63 is arranged between the diffraction grating 61 and the reflector 64 (as plane reflecting mirror), thereby vertically and horizontally rotating the polarization state when passing through the diffraction grating 61 at the first time (when transmitting from the concave mirror 5 to the reflector 64) and the polarization state when passing therethrough at the second time (when transmitting from the reflector 64 to the concave mirror 5). Thus, it is possible to uniform the loss characteristics according to the polarization state and to reduce the polarization dependent loss (PDL) for the optical switch 1B.

In this manner, according to the optical switch 1B according to the third embodiment of the present invention, the advantages similar to those in the second embodiment can be obtained. Additionally, since the optical device 8 expands the beam diameter of an input light in the direction in which a wavelength-multiplexed light is spectrally diffracted, the beam diameters of lights incident into the MEMS mirrors 71 to 73 can be reduced in the arrangement direction of the MEMS mirrors 71 to 73, thereby achieving the increase in the wavelength range to pass through, the increase in the number of signal channel wavelengths, and the narrowing of the channel wavelength interval for the optical switch 1B.

The reflecting mirror 62B constituted of the reflector 64 formed on the rear face of the $\lambda/4$ wavelength plate 63 can uniform the loss characteristics according to the polarization state, and reduce the polarization dependent loss (PDL) for the optical switch 1B.

Figure 6:
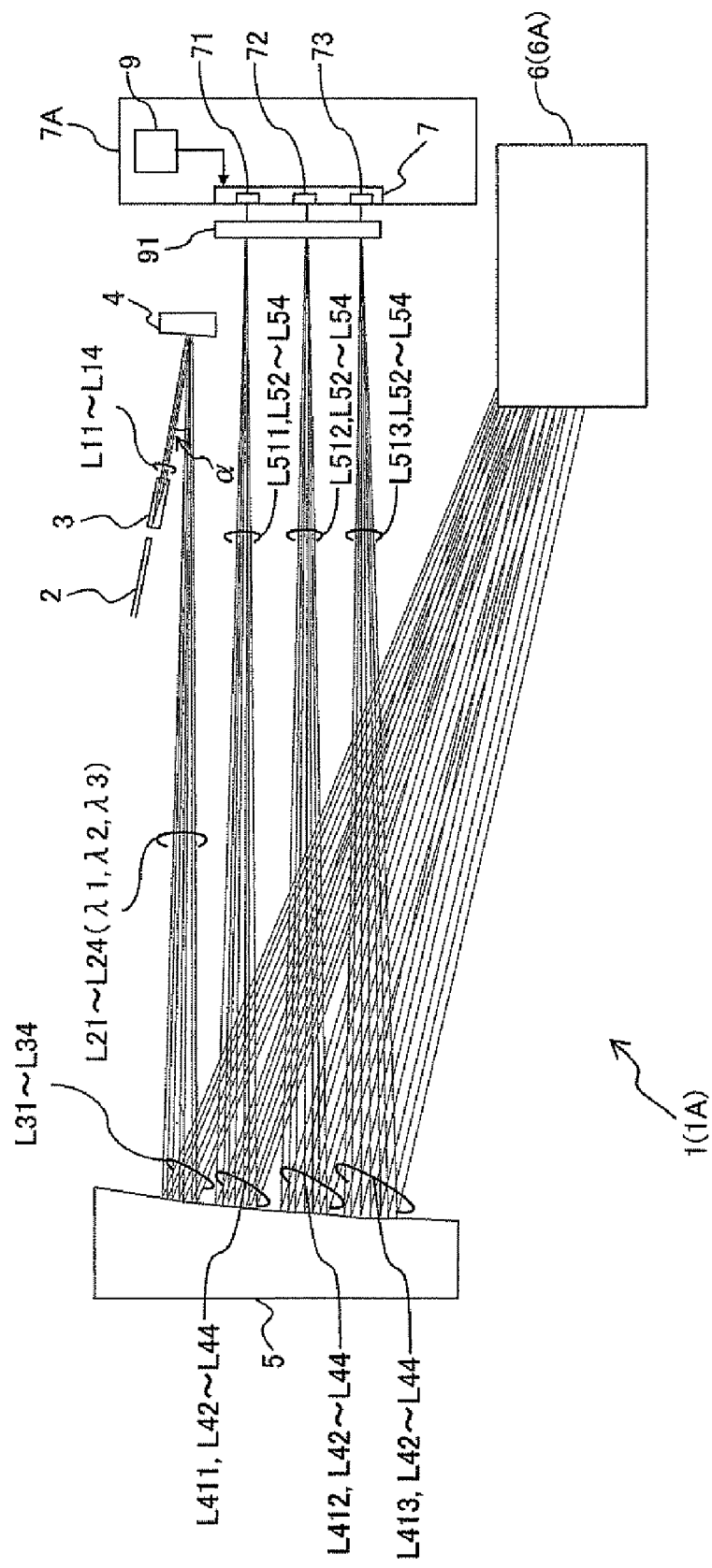
FIG. 6 is a top schematic view showing a variant of the optical switch according to the first and second embodiments of the present invention.

Also in the optical switches 1 and 1A according to the first and second embodiments, for example as shown in FIG. 6, when a $\lambda/4$ wavelength plate 91 is provided immediately before the reflecting faces of the MEMS mirrors 71 to 73 on the optical path between the MEMS mirrors 71 to 73 and the concave mirror 5, it is possible, as in the case of the $\lambda/4$ wavelength plate 63, to vertically and horizontally rotate the polarization state when passing through the diffraction grating 61 at the first time (when a light for each wavelength toward the MEMS mirror 71 to 73 is output from the diffraction grating 6 or 61) and the polarization state when passing therethrough at the second time (when a light for each wavelength reflected on the MEMS mirror 71 to 73 is combined in the diffraction grating 6 or 61), and thus the loss characteristics can be made uniform according to the polarization state and the polarization dependent loss (PDL) for the optical switch 1B can be reduced.

[D] Description of Variant of Each Embodiment

Figure 7:
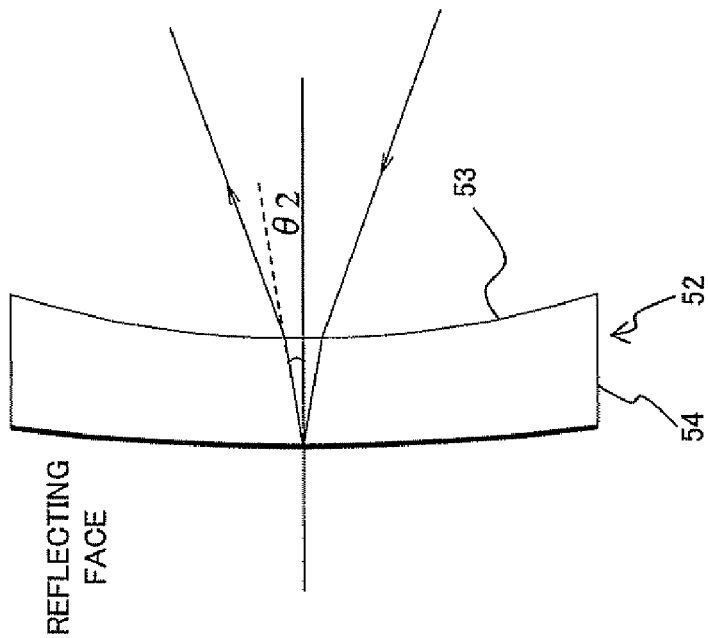
FIGS. 7 to 10 show structure examples of a concave mirror according to each embodiment of the present invention.
Figure 8:
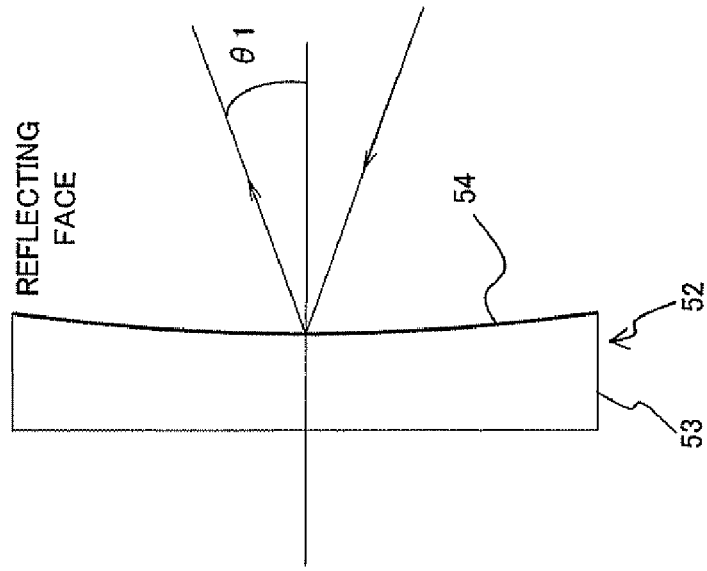

In the optical switch 1, 1A or 1B according to each embodiment, a surface reflective concave mirror 51 in which a reflecting film 54 is deposited on the surface of an optical glass 53 is employed as the concave mirror 5 as shown in FIG. 7, but the concave mirror 5 can be constituted of a rear-face reflective concave mirror 52 in which the reflective film 54 is deposited on the rear face of the optical glass 53 as an optical transmission member as shown in FIG. 8. The concave mirror 5 can be constituted of the rear-face reflective concave mirror 52 as shown in FIG. 8 so that refraction angle $\theta 2$ can be made smaller than the case in FIG. 7 ($\theta 1$), thereby reducing the deflection amount of the optical axis in the reflecting face and reducing an aberration to occur.

Figure 10:
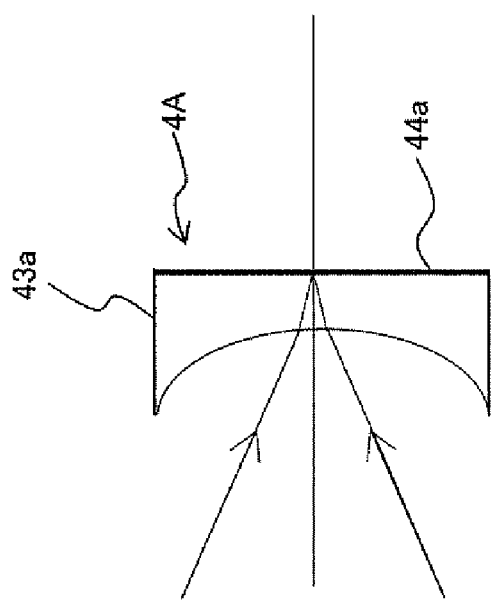

Similarly, the convex mirror 4 can be constituted of a surface mirror 41 in which a reflecting film 44 is formed on the surface of an optical glass 43 as an optical transmission member (on the face on which an input light from the collimate lens 31 is incident), and may be constituted of an optical member 4A in which a reflecting film 44a is formed on the rear face of a glass member 43a whose surface is concave and whose rear face is plane as shown in FIG. 10.

The shape of the face of the concave mirror 5 opposed to the convex mirror 4, the diffraction grating 6 (61) and the MEMS mirrors 71 to 73 may be, for example, spherical surface, paraboloidal surface, non-spherical surface, or sculptured surface.

Figure 11:
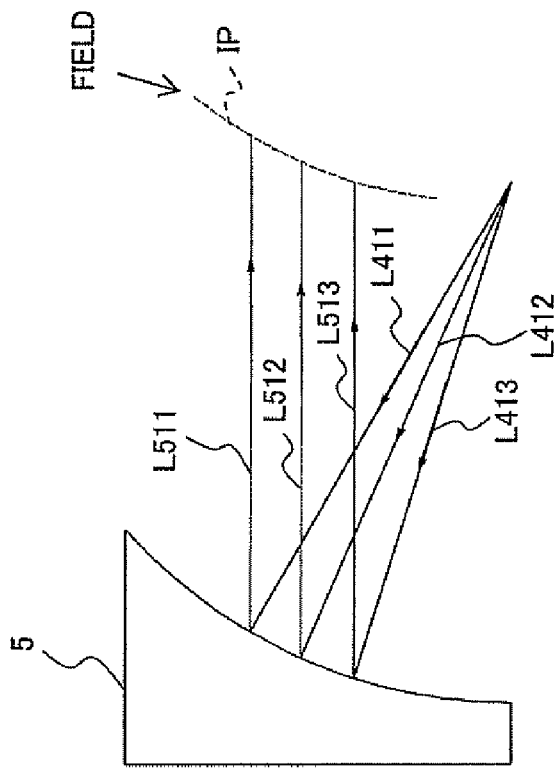
FIG. 11 is a diagram for explaining a field curvature.

In the optical switch 1, 1A or 1B according to each embodiment, since the position on which the lights L511 to L513 reflected on the concave mirror 5 are focused is a so-called field curvature, it is not strictly perpendicular to the optical axis. FIG. 11 illustrates the field curvature IP when the face of the concave mirror 5 opposed to the MEMS mirrors 71 to 73 is spherical surface. The field curvature causes a center wavelength deviation in the passband for the optical switch 1, 1A or 1B.

Figure 12:
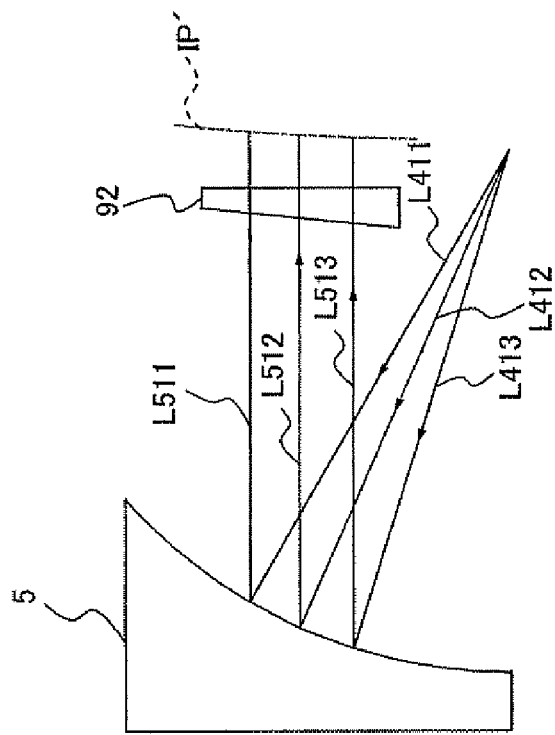
FIG. 12 is a diagram showing a variant of each embodiment of the present invention.

In order to reduce the center wavelength deviation in the passband, the MEMS mirror package 7A is inclined to be arranged according to the inclination of the field curvature and the reflecting faces of the MEMS mirrors 71 to 73 can be arranged at the positions on which each light L511 to L513 focuses. Alternatively, for example as shown in FIG. 12, an optical glass 92 as an optical member for correcting the field curvature of wavelength component lights reflected on the concave mirror 5 toward the MEMS mirrors 71 to 73 may be provided on the optical path between the concave mirror 5 and the MEMS mirrors 71 to 73.

The optical glass 92 has a wedge shape which approximates a curved face or curved line for correcting the optical path length by a straight line, and this optical glass 92 is arranged, for example, immediately before the reflecting faces of the MEMS mirrors 71 to 73, thereby reducing a deviation of the optical path lengths.

That is, when a thickness of the optical glass 92 is assumed as "d" and a refraction factor thereof is assumed as "n", the optical distance is expressed as "nd". Thus, the optical glass 92 has a thickness corresponding to the optical distance to be corrected according to the position through which each light L511 to L513 passes and is arranged immediately before the reflecting faces of the MEMS mirrors 71 to 73, thereby reducing the field curvature (refer to field IP' in FIG. 12). Therefore, it is possible to reduce the deviation of the optical path lengths and to reduce the deviation of the center wavelengths in the passband for the optical switch 1, 1A or 1B.

Though the MEMS mirrors 71 to 73 require to be arranged according to the wavelength interval, the focusing position is different for each wavelength according to non-linearity of the dispersion angle of the diffraction grating 6 or 61 or the shape of the concave mirror 5. Thus, the pitch of the MEMS mirrors 71 to 73 is determined in correspondence to the focusing position, thereby reducing the center wavelength deviation in the passband.

[E] Others

The present invention is not limited to the above embodiments, and can be variously modified without departing from the spirit of the present invention.

Figure 9:
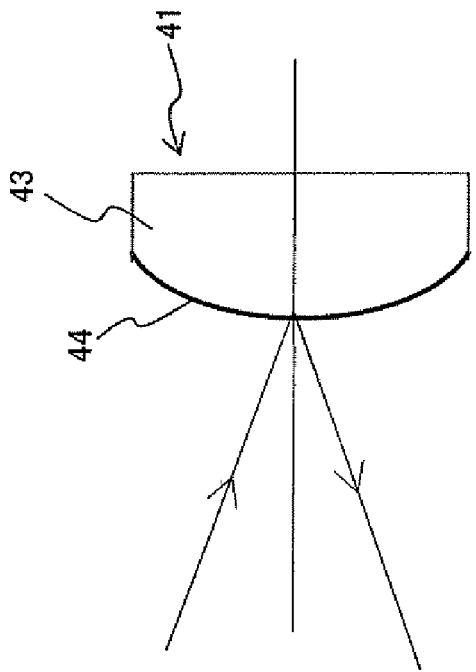

For example, the optical device 8 according to the third embodiment can be implemented by appropriately combining the optical switch 1 or 1A according to the first or second embodiment with each variant shown in FIG. 7 or FIG. 9.

Furthermore, the structure of (number of input ports)×(number of output ports) is not limited to the 1×3 structure, and maybe 1×N or N×1 structure. Further, the optical fiber array 2 and the collimate array 3 are arranged in matrix and the MEMS mirrors constituting the MEMS mirror array 7 are accordingly arranged in matrix, thereby achieving N×M structure (N and M are natural numbers).

It is possible to manufacture the apparatus according to the present invention from the disclosure of the above embodiments.

What is claimed is:

1. An optical switch comprising:
a curved reflecting unit comprising a curved reflecting face,
a movable mirror array unit comprising a plurality of movable mirrors opposed to the reflecting face,
a reflecting unit between the curved reflecting unit and the movable mirror array unit and comprising a reflecting face opposed to the curved reflecting face,
a wavelength dispersing unit directing lights sequentially reflected in the reflecting unit and the curved reflecting unit at an angle different for each wavelength and giving the same to the curved reflecting unit, and
a controller controlling reflecting faces of the mirrors of the movable mirror array unit such that wavelength components of a light, which is input from any one port among a plurality of ports provided at the reflecting face of the reflecting unit and is given to the wavelength dispersing unit via the curved reflecting unit to be wavelength-dispersed, are output in a direction different from the one port.

2. An optical switch comprising:
a curved reflecting unit comprising a curved reflecting face,
a movable mirror array unit comprising a plurality of movable mirrors opposed to the reflecting face,
a reflecting unit between the curved reflecting unit and the movable mirror array unit and comprising a reflecting face opposed to the curved reflecting face,
means for directing lights sequentially reflected in the reflecting unit and the curved reflecting unit at an angle different for each wavelength and giving the same to the curved reflecting unit, and
means for controlling reflecting faces of the mirrors of the movable mirror array unit such that wavelength components of a light, which is input from any one port among a plurality of ports provided at the reflecting face of the reflecting unit and is given to the means for directing via the curved reflecting unit to be wavelength-dispersed, are output in a direction different from the one port.

3. A method of controlling an optical switch which includes a curved reflecting unit comprising a curved reflecting face, a movable mirror array unit comprising a plurality of movable mirrors opposed to the reflecting face, and a reflecting unit between the curved reflecting unit and the movable mirror array unit and comprising a reflecting face opposed to the curved reflecting face, the method comprising:
directing lights sequentially reflected in the reflecting unit and the curved reflecting unit at an angle different for each wavelength and giving the same to the curved reflecting unit, and
controlling reflecting faces of the mirrors of the movable mirror array unit such that wavelength components of a light, which is input from any one port among a plurality of ports provided at the reflecting face of the reflecting unit and is given to the said directing via the curved reflecting unit to be wavelength-dispersed, are output in a direction different from the one port.

* * * * *